UNITED STATES PATENT OFFICE.

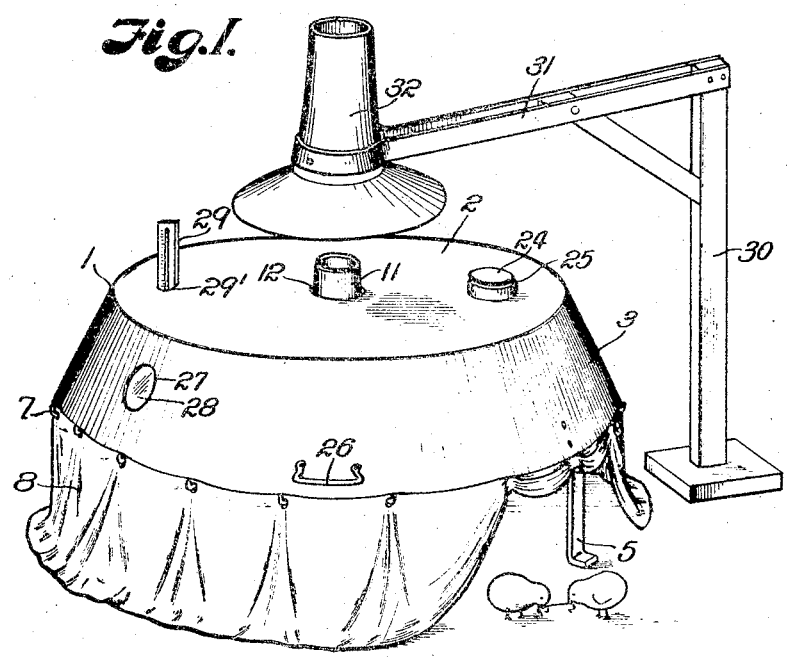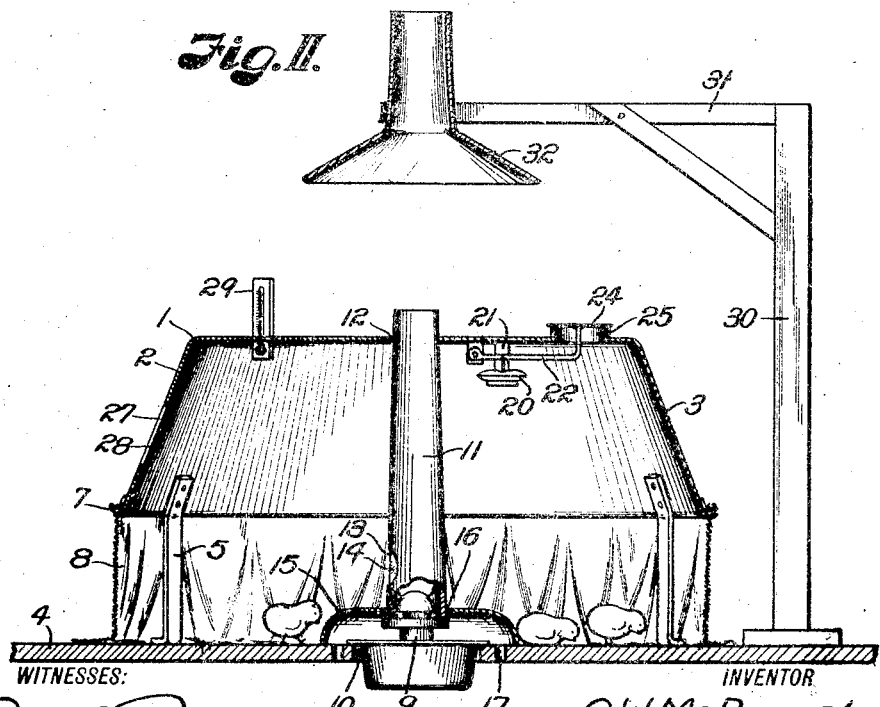

CHARLES W. McDOUGAL, JR., OF BEAGLE, KANSAS.

HOVER.

1,235,350.
Specification of Letters Patent.
Patented July 31, 1917.

Application filed October 3, 1914. Serial No. 864,908.

*To all whom it may concern:*

Be it known that I, CHARLES W. McDOUGAL, Jr., a citizen of the United States, residing at Beagle, in the county of Miami and State of Kansas, have invented certain new and useful Improvements in Hovers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to hovers for chicks, and has for its principal object to provide a device of this character which may be thoroughly ventilated, and in which the products of combustion from the heating element are carried away from the hover.

A further object of the invention is to provide the hover with an automatic ventilator for regulating the temperature irrespective of the heater, so that the heater may always operate at normal capacity without injuriously affecting the chicks by extremes of temperature.

In accomplishing these objects I have provided the improved details of structure hereinafter described and illustrated in the accompanying drawings, wherein:—

Figure I is a perspective view of a hover constructed in accordance with my invention.

Fig. II is a central vertical section of the same.

Referring more in detail to the parts:—

1 designates a hover constructed according to my invention, comprising an inverted hood 2, having outwardly flared sides 3, and supported above the floor 4 by legs 5 that are riveted or otherwise secured to the sides 3.

Equally spaced along the lower edge of the sides 3 and extending therearound are hooks 7, from which is suspended a curtain 8 of sufficient length to contact the floor, so that it will not be blown back and forth by a breeze and so that heat may be retained within the hood.

In order that heat may be supplied to the interior of the hood when necessary, I provide a lamp 9, which is preferably seated within an aperture 10, in the floor, and is provided with an upwardly extended flue 11 which passes through a centrally disposed aperture 12 in the hood 2 and has a cut-out portion 13 provided with a transparent covering 14, such as mica, through which the flame may be observed.

Encircling the lamp and flue 11 is a guard 15, having a central aperture 16 therein through which the said flue is projected, and by which means the chicks are prevented from coming in contact with the heated surface of the flue or the oily surface of the lamp. Apertures 17 are also provided in the floor 4 beneath the guard 15 so that a constant supply of fresh air may be admitted therethrough to the lamp flame.

As a means of regulating the temperature within the hood, I provide a thermostatic device 20 which is supported on an arm 21 that is secured to the hood top and adapted for actuating a pivotally mounted arm 22 to raise or lower a damper 24 which covers an outlet 25 in the hood top and whereby the same is opened or closed.

For convenience in moving the device, I provide handles 26 which are riveted or otherwise secured on opposite sides of the hood. I also provide the hood with a side opening 27 having a transparent covering 28; the side opening being so located that an operator may observe the lamp flame therethrough and through the opening in the flue 11 without necessitating the raising of the curtain or hood, and through which light is admitted to the hover.

A thermometer 29 is projected within an opening 29' in the hood top, so that the temperature therein may be noted at any time.

Mounted at one side of the hover is a standard 30 having a horizontally extended arm 31, and carried thereby is a funnel-shaped chimney 32 which is supported directly over the flue 11 in order to catch the current therefrom and to produce an additional current that will be strong enough to carry off all the gas and soot from the vicinity of the hover. It is apparent that should the hover be inclosed within a brooder (not shown) the said funnel-shaped chimney would be made secure thereto and thus dispense with the supporting standard 30.

Presuming the parts to be constructed and assembled as described, the lamp is lighted and chicks placed within the hood. With the lamp in operation the interior of the hood becomes warm; the temperature being somewhat regulated by the lamp flame, but should it become too warm, the thermostatic regulator, previously adjusted, causes the raising of the damper to open the outlet, allowing the heated air to escape and closes when the proper temperature has been reached.

It will be seen that the chicks are free to move about within the hover, and if it is desired that they should pass in and out, the curtain may be held by the hooks as shown on Fig. I to provide an opening.

Having thus described my invention, what I claim as new therein, and desire to secure by Letters-Patent, is:—

The combination with a floor having an aperture therein, of a hood supported above the floor, a canopy suspended from said hood, a lamp comprising a body part suspended in the aperture of said floor and a burner located above the floor, a flue rising from said burner and projecting through the top of said hood, a guard surrounding the burner within the chamber formed by the hood and canopy, a standard supported on said floor having an arm extending over the hood, and a flue suspended from said arm over the first named flue, but independent thereof.

In testimony whereof I affix my signature in presence of two witnesses.

CHARLES W. McDOUGAL, Jr.

Witnesses:
 OSCAR GRANT,
 ORA McDANIEL.